US009163594B1

(12) United States Patent
Kever

(10) Patent No.: US 9,163,594 B1
(45) Date of Patent: Oct. 20, 2015

(54) TUNNEL RAM INTAKE MANIFOLD FOR IMPROVED LOW RPM OPERATION

(71) Applicant: Wayne Kever, Fort Collins, CO (US)

(72) Inventor: Wayne Kever, Fort Collins, CO (US)

( * ) Notice: Subject to any disclaimer, the term of this patent is extended or adjusted under 35 U.S.C. 154(b) by 0 days.

(21) Appl. No.: 14/285,699

(22) Filed: May 23, 2014

Related U.S. Application Data

(63) Continuation of application No. 13/302,451, filed on Nov. 22, 2011, now Pat. No. 8,733,312.

(60) Provisional application No. 61/416,146, filed on Nov. 22, 2010.

(51) Int. Cl.
 *F02M 35/10* (2006.01)
 *F02M 35/104* (2006.01)
 *F02B 27/02* (2006.01)
 *F02B 75/22* (2006.01)

(52) U.S. Cl.
 CPC ....... *F02M 35/10091* (2013.01); *F02M 35/104* (2013.01); *F02M 35/10196* (2013.01); *F02B 27/02* (2013.01); *F02B 75/22* (2013.01)

(58) Field of Classification Search
 CPC .................. F02M 35/10321; F02M 35/10144; F02M 13/112; F02M 13/116; F02M 35/10045; F02B 75/22; F02B 27/02; F02B 27/0252; F02B 2075/1816
 USPC .................. 123/184.21, 184.48, 184.35, 579
 See application file for complete search history.

(56) References Cited

U.S. PATENT DOCUMENTS

| 2,730,091 | A | * | 1/1956 | Burrell ......................... 123/547 |
| 2,896,597 | A |   | 7/1959 | Patrick |
| 3,142,289 | A |   | 7/1964 | Platner |
| 3,303,832 | A |   | 2/1967 | Platner et al. |
| 3,363,610 | A |   | 1/1968 | Massarotti |
| 3,561,408 | A | * | 2/1971 | Weiand .................... 123/184.34 |
| 3,563,220 | A | * | 2/1971 | Garner .......................... 123/579 |
| 3,783,843 | A |   | 1/1974 | McFarland, Jr. |
| 4,318,371 | A |   | 3/1982 | McFarland |

* cited by examiner

*Primary Examiner* — Lindsay Low
*Assistant Examiner* — Syed O Hasan
(74) *Attorney, Agent, or Firm* — Perkins Coie LLP

(57) ABSTRACT

A manifold including first and second divider bodies each having a carburetor mounting flange. The first divider body includes a first and a second plenum, and the second divider body includes a third and a fourth plenum. A first pair of runners extends from the first port flange to the first plenum; a second pair of runners extends from the first port flange to the third plenum; a third pair of runners extends from the second port flange to the second plenum; and a fourth pair of runners extends from the second port flange to the fourth plenum. Accordingly, in operation, each plenum will present only one carburetor venturi to the cylinder in a low-RPM, low-throttle opening induction event, thus keeping the peak velocity through the carburetor's venturi high even at low RPM.

15 Claims, 11 Drawing Sheets

TUNNEL RAM INTAKE MANIFOLD FOR IMPROVED LOW RPM OPERATION

CROSS REFERENCE TO RELATED APPLICATIONS

This application is a continuation of U.S. patent application Ser. No. 13/302,451, filed on Nov. 22, 2011, now allowed, which claims the benefit of U.S. Provisional Patent Application No. 61/416,146, filed Nov. 22, 2010, the disclosure of each of which is hereby incorporated by reference in its entirety.

BACKGROUND

In carbureted V-8 engines, a popular type of intake manifold for racing applications is the tunnel ram. A tunnel ram intake manifold generally features a single large plenum to which eight intake runners connect to the cylinder heads through a long straight path. Usually two 4-venturi, or barrel, carburetors are mounted to the top of the plenum. This manifold and carburetion combination is excellent for maximum power production at high RPM, which is what is needed for racing engines. The length of the intake runners on a tunnel ram intake result in a distinctive tall intake manifold that usually extends through the hood of the vehicle or requires the use of a large hood scoop.

Many automotive enthusiasts build vehicles (cars or trucks) for street use but want them to have the appearance of a racing vehicle. These vehicles are often referred to as "street rods." Given its distinctive appearance, many street rod enthusiasts would like to use the tunnel ram intake for its race car like appearance on their otherwise street tuned engine. However, the tunnel ram does not work well on most street tuned engines.

In order for a tunnel ram to work properly, the rest of the engine and drive train should be specified for use with a tunnel ram intake manifold. For example, for a tunnel ram to work well, the engine needs to be operated at a relatively high RPM, in the range of approximately 3500-7000 RPM. For operation on the street, particularly with unmodified automatic transmissions, low RPM performance below 3500 RPM is important. In street driving with OEM automatic transmission torque converter stall speeds, and gearing designed to keep RPM down for quiet operation and good fuel economy, the engine is nearly always operating below 3500 RPM. Tunnel ram engines typically do not produce good torque at low RPM. Thus, for street use in slow speed stop and go traffic a tunnel ram equipped engine has poor drivability characteristics. There is no solution currently available which makes a tunnel ram intake manifold suitable for low-RPM operation in a street application. In all cases, existing tunnel ram manifolds have unacceptable reductions in low-RPM torque production.

Also, where the engine is unmodified or only slightly modified, the engine will not be able to operate at the higher RPMs required for the tunnel ram to reach its maximum potential performance benefits. Many OEM camshafts are designed to produce good torque from idle to roughly 5000 RPM. As mentioned above the tunnel ram is designed to work up to 7000 RPM. Thus, with an OEM configured engine a large portion of the tunnel rams effective range is not used.

When used with electronic port fuel injection systems tunnel ram intake manifolds work reasonably well in low-RPM street applications. With fuel injection, a separate fuel injector is provided for each intake runner. This eliminates the poor fuel distribution problems associated with carburetor tunnel ram combinations. In addition, the electronic computer calculates the fuel delivery needed under all conditions, using electronic sensors. However, electronic fuel injection has some important drawbacks for street rod use. First, it is expensive in comparison with a carburetion system. Secondly, the fuel injectors and their associated fuel rails dramatically change the appearance of the intake manifold system, and thus detract from the desired street rod appearance. The desire is typically to have a tunnel ram with two 4-venturi carburetors. Fuel injectors detract from the authentic carbureted racing engine appearance desired by street rod enthusiasts. Another drawback is that tuning electronic fuel injection in any non-OEM application requires knowledge, skills, and equipment that many enthusiasts do not usually have available.

Accordingly, there is a need for a tunnel ram intake manifold that works well with carburetors at lower engine operating speeds. Furthermore, there is a need for a device that allows a traditional tunnel ram intake manifold to operate at lower engine speeds.

SUMMARY

Disclosed herein is a tunnel ram manifold, a divider body for use with a conventional tunnel ram base, and a tunnel ram intake manifold kit, all of which are useful for providing low RPM engine performance. In an embodiment, the tunnel ram manifold comprises first and second port flanges mateable to an engine, such as a V8 engine, for example. The port flanges may be configured to mate with the cylinder heads of the engine.

The manifold includes first and second divider bodies each having a carburetor mounting flange. The first divider body includes a first and a second plenum, and the second divider body includes a third and a fourth plenum. A first pair of runners extends from the first port flange to the first plenum; a second pair of runners extends from the first port flange to the third plenum; a third pair of runners extends from the second port flange to the second plenum; and a fourth pair of runners extends from the second port flange to the fourth plenum. Accordingly, in operation, each plenum will present only one carburetor venturi to the cylinder in a low-RPM, low-throttle opening induction event, thus keeping the peak velocity through the carburetor's venturi high even at low RPM. In an embodiment, the manifold further comprises a joint located between each divider body and its associated runners. Thus, it is contemplated that the manifold may be integrally formed as a unitary body or may be comprised of multiple parts.

The first and second divider bodies each include a divider wall between each divider body's respective plenums. Each divider wall may extend longitudinally with respect to the engine. In an embodiment, each plenum includes an inlet opening adjacent to its associated carburetor mounting flange converging to an aperture that is smaller than the inlet opening. This may be accomplished by including a pair of sloped surfaces, for example, that extend from the inlet opening to the aperture. In an embodiment, the inlet opening is obround in shape and the aperture may be rectangular in shape.

In another embodiment, the tunnel ram manifold comprises first and second port flanges and first and second divider bodies. The first divider body includes a first and a second plenum, and the second divider body includes a third and a fourth plenum. A first runner extends from the first port flange to the first plenum; a second runner extends from the second port flange to the first plenum; a third runner extends from the first port flange to the second plenum; a fourth runner extends from the second port flange to the second plenum; a fifth runner extends from the first port flange to the third plenum; a sixth runner extends from the second port flange to the third plenum; a seventh runner extends from the first port flange to the fourth plenum; and an eighth runner extends from the second port flange to the fourth plenum. In this embodiment, the first and second divider bodies each include a divider wall between each divider body's respective plenums that extends transversely with respect to the engine.

Also disclosed herein is a divider body for use with a conventional tunnel ram base. In an embodiment, the divider body comprises a mounting flange securable to a conventional tunnel ram base. The divider body includes a carburetor flange and a body portion extending between the mounting flange and the carburetor flange. A divider wall separates the body portion into two plenums. In an embodiment, the mounting flange is configured such that the divider wall extends longitudinally with respect to the conventional tunnel ram base when the mounting flange is secured thereto. The mounting flange may be configured such that the divider wall extends transversely with respect to the conventional tunnel ram base when the mounting flange is secured thereto.

Also disclosed is a tunnel ram intake manifold kit. The kit comprises at least one divider body and at least one carburetor. The divider body comprises a mounting flange securable to a conventional tunnel ram base and a carburetor flange for mounting the carburetor. A body portion extends between the mounting flange and the carburetor flange and a divider wall separates the body portion into two plenums. The kit may include a pair of divider bodies and a pair of carburetors. In an embodiment, the kit also includes a conventional tunnel ram base.

These and other aspects of the tunnel ram intake manifold will be apparent after consideration of the Detailed Description and Figures herein.

BRIEF DESCRIPTION OF THE DRAWINGS

The accompanying drawings, which are incorporated in and constitute a part of this specification, illustrate embodiments of an improved tunnel ram intake manifold and together with the description, serve to explain the principles and operation thereof. Like items in the drawings are generally referred to using the same numerical reference.

DETAILED DESCRIPTION

Figure 1:
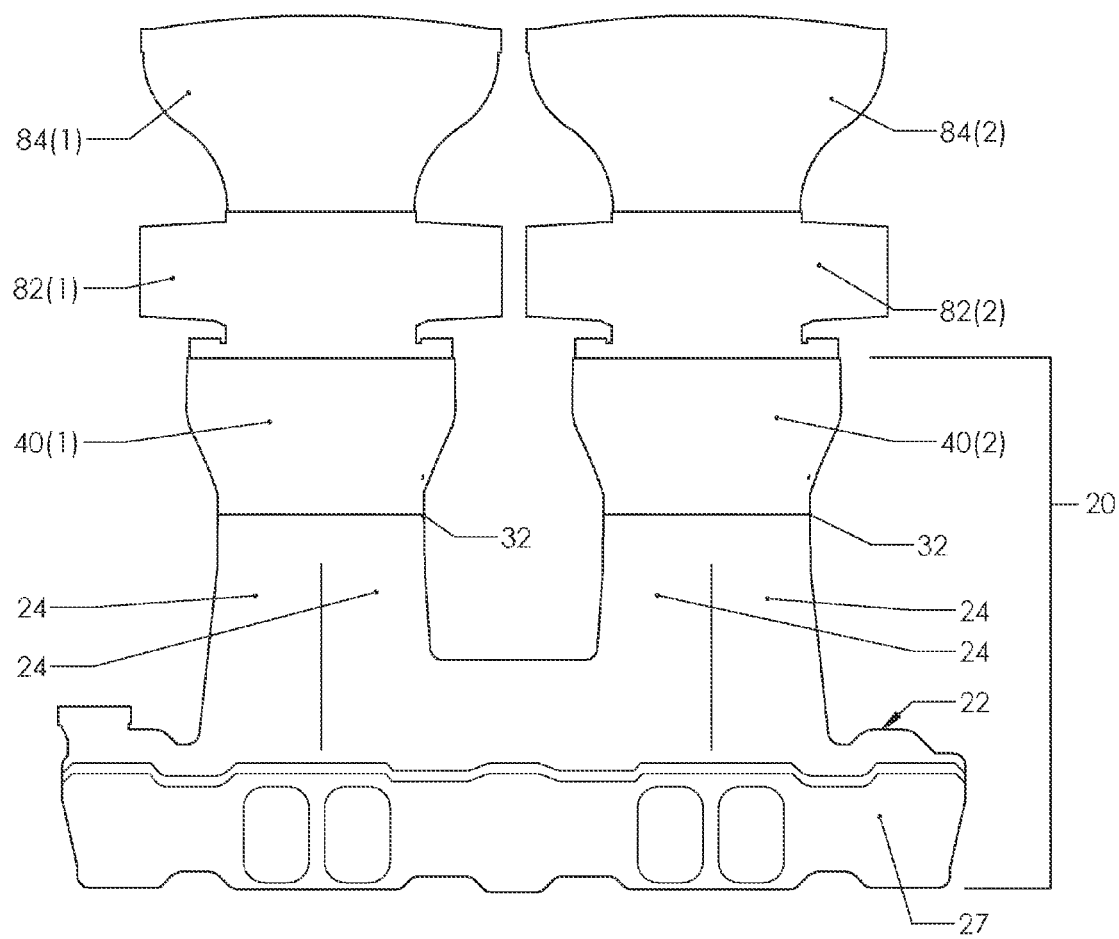
FIG. 1 is a side view in elevation of a tunnel ram intake manifold according to a first exemplary embodiment with associated carburetors and air cleaners attached thereto.

Provided herein is an improved tunnel ram manifold design that improves the low RPM performance of the traditional tunnel ram manifold by dividing the large single plenum of the tunnel ram into four separate plenums, each connected to only two intake runners. The low RPM performance is thereby improved while maintaining the distinctive race car appearance of the tunnel ram, which is of paramount importance to the typical street rod enthusiast.

A carburetor meters the appropriate amount of fuel according to engine demand based on intake air flow into the engine. Carburetors operate on the principle that as the velocity of air flow increases, its pressure decreases. Carburetors are configured to take advantage of the pressure differential created between atmospheric pressure surrounding the carburetor and a low pressure region created inside the carburetor, usually by way of a venturi. As an engine draws more air through the venturi the low pressure region (i.e. signal) created by the increasing air velocity draws a metered amount of fuel into the intake air flow stream.

With a single large plenum design like the traditional tunnel ram (also called a single plane design), each induction event goes through two or more venturis. A traditional tunnel ram intake has a single large plenum enclosed by a cover that includes two 4-barrel carburetor mounts. Thus, each induction event draws air through multiple venturis depending on the type of carburetors employed. An example of traditional single plane tunnel ram manifolds includes the Victor Ram, Part No. 7070, marketed by Edelbrock® of Torrance, Calif. When an induction event goes through two or more venturis it reduces the air velocity through those venturis, which in turn reduces the strength of the signal to the fuel metering system. The weakened signal through the venturis of a tunnel ram carburetion configuration accounts for the poor low RPM performance described above. This situation is exacerbated by the presence of two 4-venturi carburetors on the typical tunnel ram. In this situation, four venturis are flowing air even at part throttle operation, and the signal to each venturi is very weak. Therefore fuel metering at low RPM is poor.

Because low RPM operation is important in street applications, nearly all OEM V8 engines with carburetion use a dual-plane intake manifold, such as the Performer RPM, Part No. 7101, also marketed by Edelbrock® of Torrance, Calif. This type of manifold usually uses a single carburetor, though a few examples with dual carburetion exist. The dual-plane manifold feeds four cylinders from one half of the carburetor through one side of the manifold, and the other four from through the other side. Half of the carburetor means a single primary and a single secondary venturi, for a 4-venturi carburetor. For example, on a Chevrolet V8 engine, cylinders 1, 4, 6, and 7 are fed from one side of the carburetor, while cylinders 2, 3, 5, and 8 are fed from the other half. Other commonly available V8 engines with cruciform crankshafts use similar dual-plane intake manifolds.

The dual-plane intake manifold provides good low RPM performance because each intake runner is only connected to half of the carburetor. Thus at low-RPM part-throttle operation, when only one venturi is operating in each half of the carburetor, the induction event goes through one venturi. This results in higher velocity of air through that single venturi, which gives the fuel delivery system a strong metering signal.

Tunnel ram intake manifolds do exist that have two separate plenums. In other words, cylinders 1, 2, 3 and 4 are fed by one carburetor, while 5, 6, 7, and 8 are fed by a second carburetor. This manifold configuration still suffers from low RPM performance problems related to a weak metering signal. Conventional tunnel rams are also available with a single carburetor mounting pad, but again two venturis are connected to a given cylinder at part throttle. In addition, the large plenum below the carburetor or carburetors in a conventional tunnel ram is very good for producing power at high RPM, but results in poor fuel distribution among the cylinders at low RPM. This is often compensated for by running a richer air-fuel mixture. However, running a richer air-fuel mixture often results in fouled spark plugs.

In order to address the limitations of traditional tunnel ram intake designs as explained above, an improved tunnel ram manifold design is provided that improves low RPM performance by dividing the large single plenum of the tunnel ram into four separate plenums. FIG. 1 illustrates a tunnel ram intake manifold 20 according to a first exemplary embodiment. In this embodiment, tunnel ram 20 includes a base portion 22 that includes a plurality of intake runners 24 and a pair of divider bodies 40(1) and 40(2) disposed thereon. Base portion 22 may comprise the base portion from a traditional tunnel ram intake manifold. For example, the base portion from a Weiand® Hi-Ram manifold, model no. 1984, is a suitable base portion (the base portion is available separately from Weiand® as part no. 5984). The Weiand® manifold is described in U.S. Pat. No. 3,561,408, the disclosure of which is hereby incorporated by reference in its entirety. As shown in FIG. 1, the tunnel ram manifold 20 is fitted with a pair of carburetors 82(1), 82(2) and a pair of velocity stacks 84(1), 84(2). In this case, the carburetors are 580CFM vacuum secondary carburetors available from Quick Fuel Technology. The carburetors may be tuned for a particular manifold configuration as necessary by adjusting the jets, emulsion circuit, air bleeds, power valve, and secondary spring settings, all of which are well understood in the art of carburetor tuning.

Figure 2:
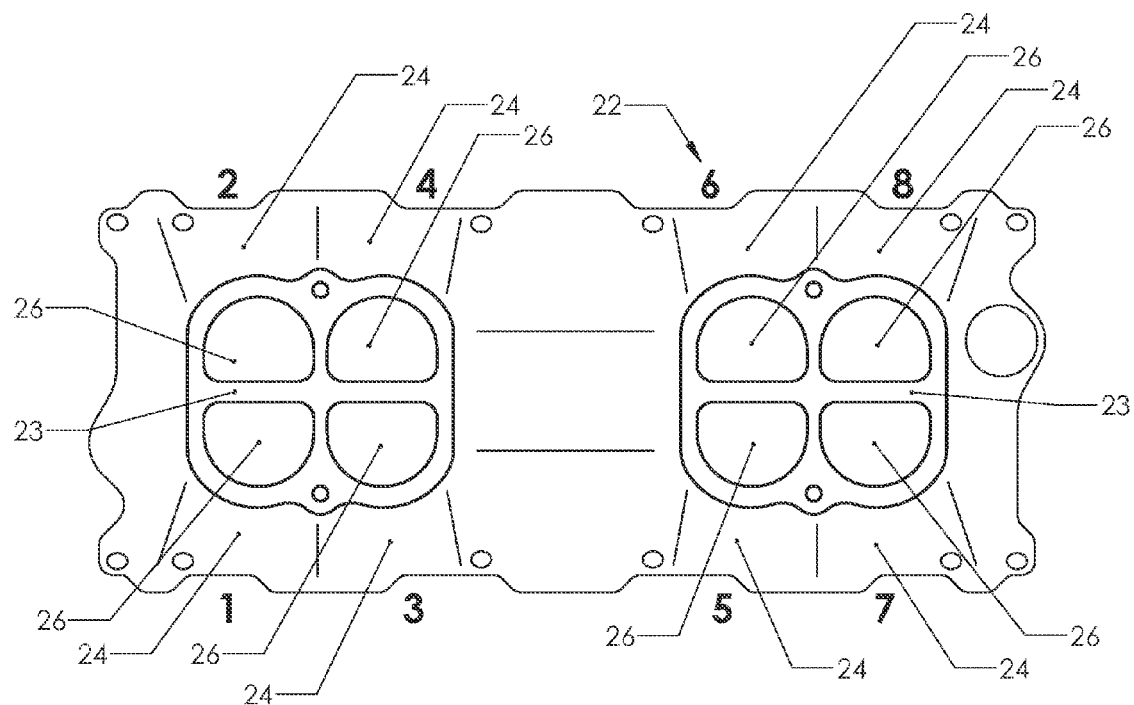
FIG. 2 is a top plan view of the base portion of the tunnel ram intake manifold shown in FIG. 1.
Figure 3:
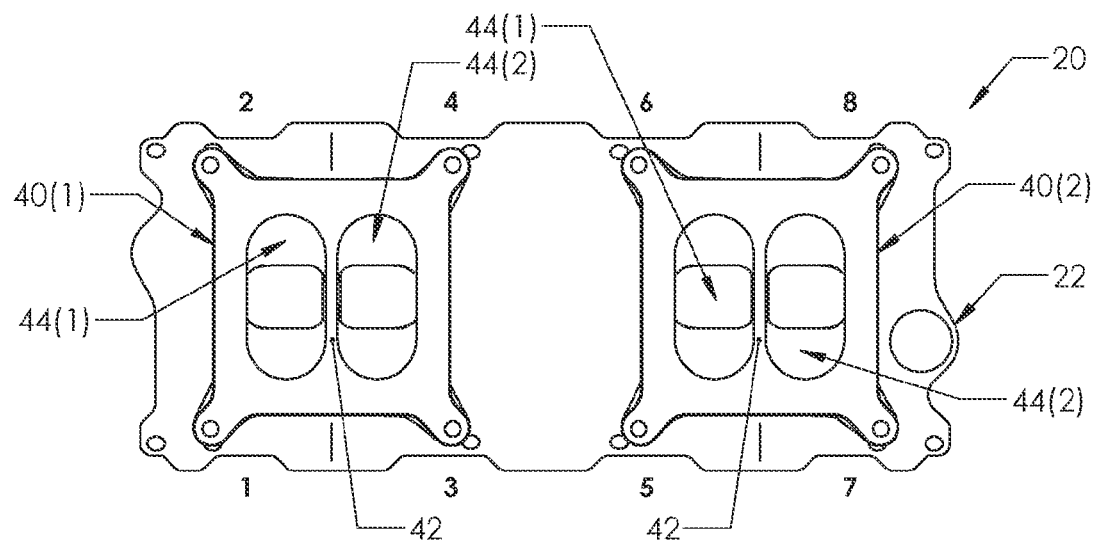
FIG. 3 is a is a top plan view of a tunnel ram intake manifold configured for sideways carburetor mounting.

With further reference to FIGS. 2 and 3, tunnel ram manifold 20 includes eight intake runners 24 corresponding to the cylinders of an eight cylinder engine. The cylinders relative locations are labeled in the figures as cylinders 1-8. While the tunnel ram manifold is described herein with respect to an eight cylinder engine application, a tunnel ram according to the present disclosure may be used on other engine configurations with different multiples of cylinders. In this application, pairs of the eight intake runners 24 each communicate with one of four separate plenums 44. With particular reference to FIG. 3, each divider body 40(1) and 40(2) is divided by a plenum divider 42 into first and second plenums 44(1) and 44(2). Accordingly, the tunnel ram 20 includes four separate plenums each communicating with only two intake runners 24. This example pairs cylinders as follows: 1-2, 3-4, 5-6, and 7-8.

In operation, each of these plenums 44 will present only one venturi to the cylinder in a low-RPM, low-throttle opening induction event, thus keeping the peak velocity through the venturi high even at low RPM. Dividing the plenum may affect peak power output, but does not limit the high RPM performance of the typical street rod engine. Even for racing applications, this style of four-plane manifold may be suitable when combined with larger capacity carburetors. Carburetors are available with a range of venturi sizes to suit engines of varying airflow capacity. For example, a few suitable 4-venturi carburetors are sold under the Holley, Edelbrock, and Barry Grant brand names, and range between 390CFM and 1250CFM in airflow rating.

Figure 4:
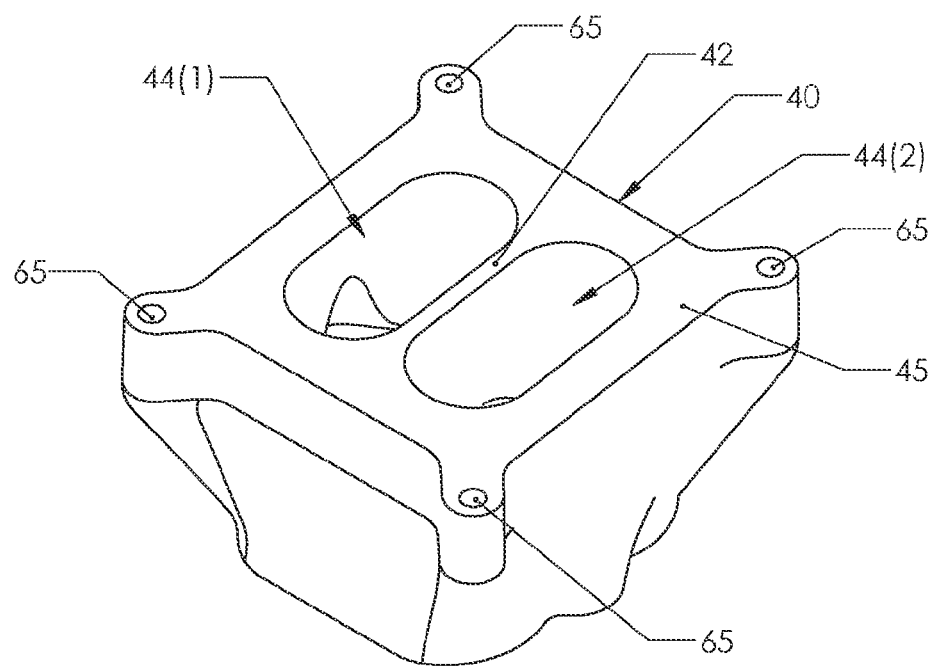
FIG. 4 is a perspective view of the divider body shown in FIG. 1 as viewed from the top.
Figure 5:
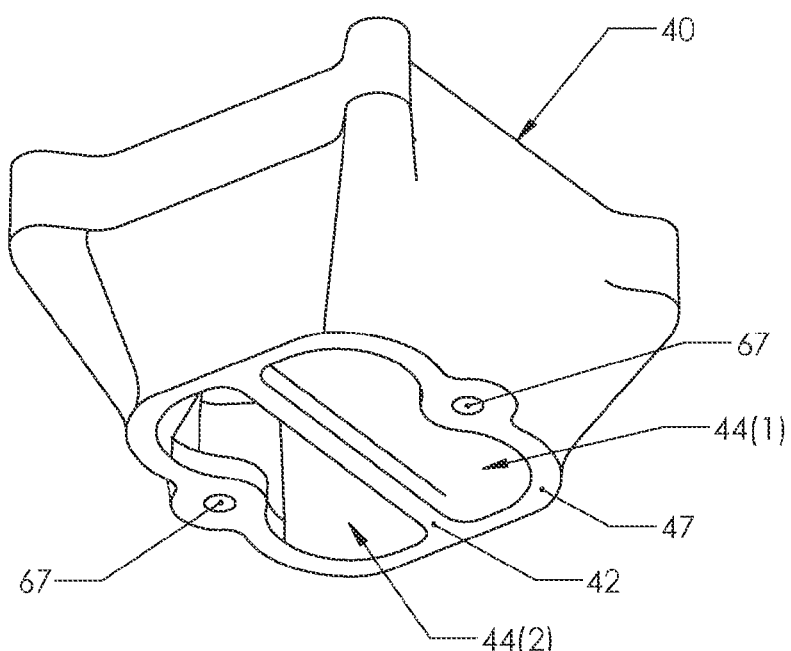
FIG. 5 is a perspective view of the divider body shown in FIGS. 1 and 4 as viewed from the bottom.

Tunnel ram 20 comprises a tunnel ram configuration having two separate bodies 44(1), 44(2) that are each divided in half as explained above. FIG. 2 shows base portion 22 of tunnel ram 20 illustrating the grouping of cylinder intake runners 24. The inlets 26 of each intake runner group are arranged together with wall 23 between them for coupling to the divider bodies and ultimately the carburetors. Each runner extends from a corresponding inlet 26 to an associated port flange 27 (see FIG. 1). With further reference to FIGS. 3-5, a divider body 40 mates with each group of intake runner inlets 26. Divider body 40(1), for example, includes two plenums 44(1) and 44(2) separated by divider 42. In this case, divider 42 extends transversely to the centerline of the engine (i.e. crankshaft) and manifold (see FIG. 3). The divider may also be oriented parallel to the centerline of the engine as is described more fully below.

Figure 6:
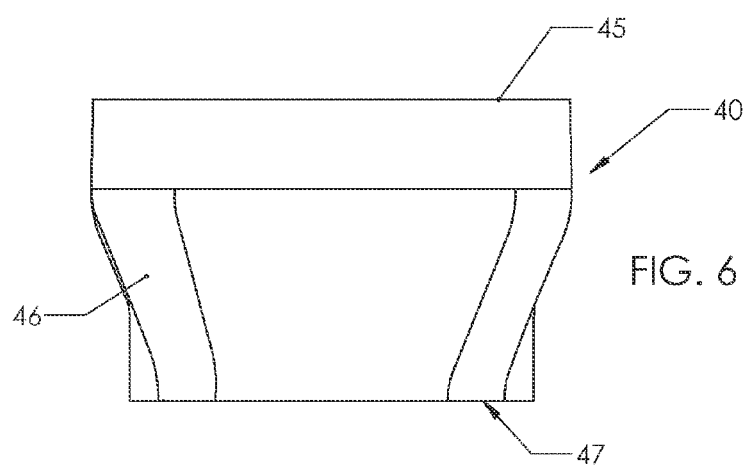
FIG. 6 is a side view in elevation of the divider body shown in FIGS. 1, 4 and 5.
Figure 10:
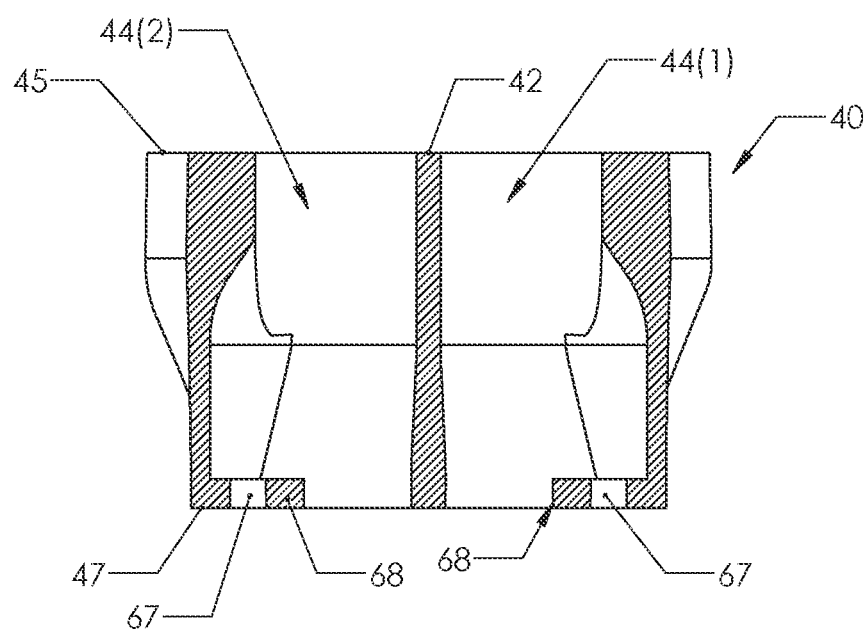
FIG. 10 is a cross-sectional side view of the divider body taken about line 10-10 in FIG. 7.

As shown in FIG. 6, each divider body 40 includes a carburetor flange 45 and a mounting flange 47 with a body portion 46 extending therebetween. Carburetor flange 45 includes a plurality of mounting apertures 65. Mounting apertures 65 may be plain bores or threaded bores for receiving a suitable carburetor mounting fastener. Mounting flange 47 includes a pair of holes 67 for mounting the divider body to the manifold base 22. As shown in FIG. 10, mounting flange 47 includes a pair of inwardly projecting tabs 68 through which holes 67 are formed. However, the tabs could project outwardly from the divider body for different applications.

Figure 7:
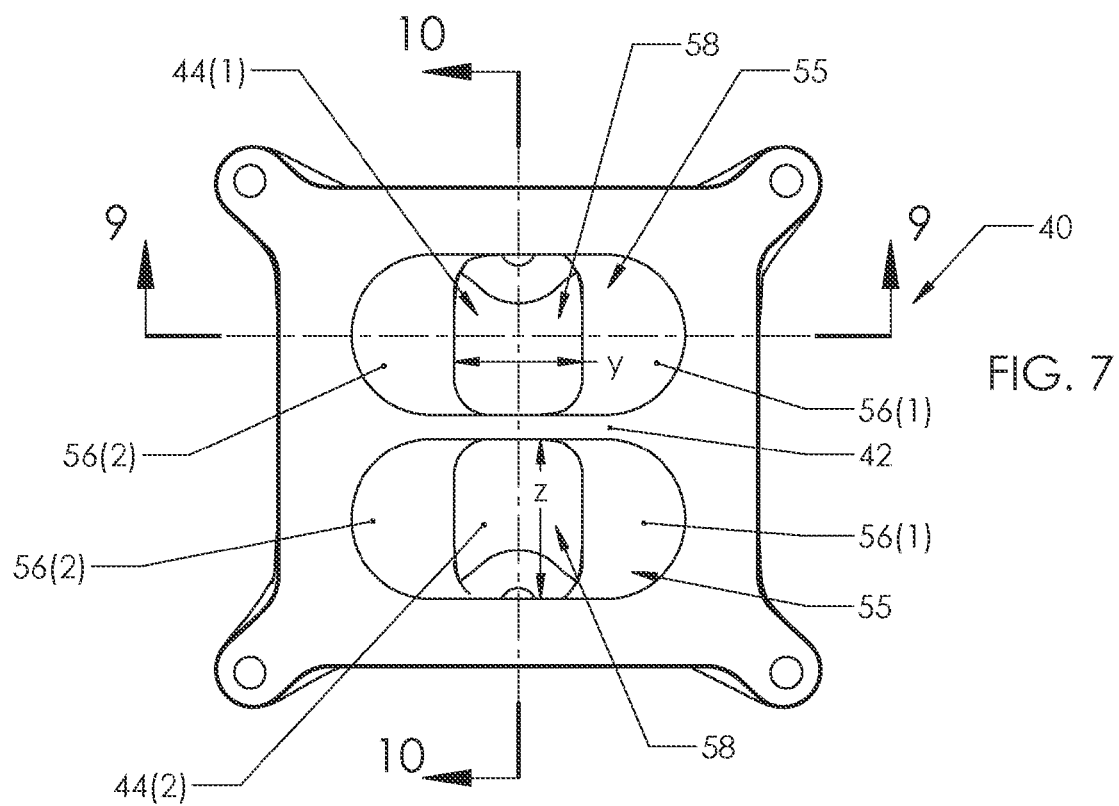
FIG. 7 is a top plan view of the divider body shown in FIG. 6.
Figure 9:
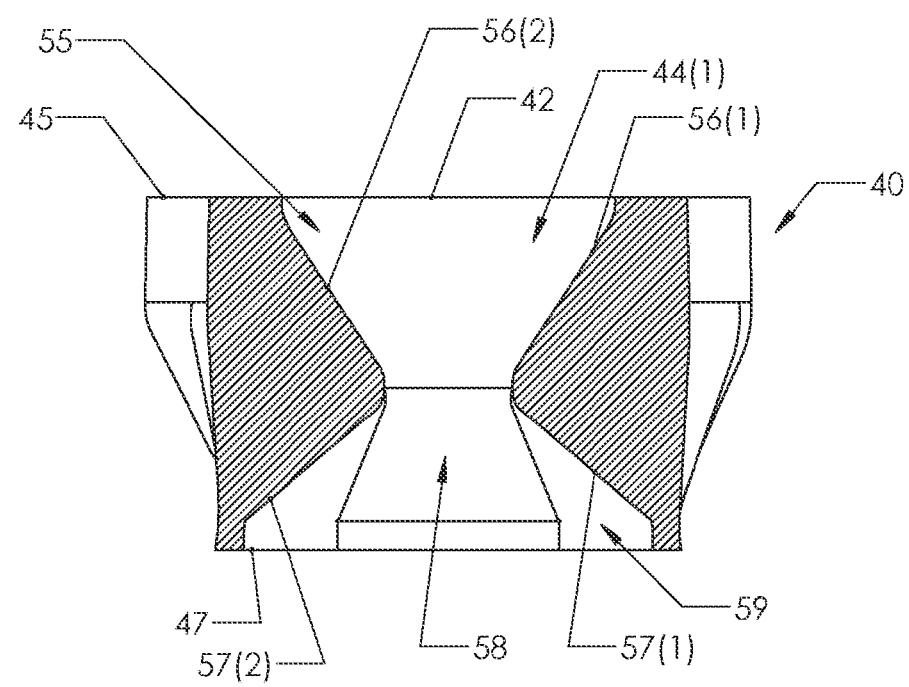
FIG. 9 is a cross-sectional side view of the divider body taken about line 9-9 in FIG. 7.
Figure 8:
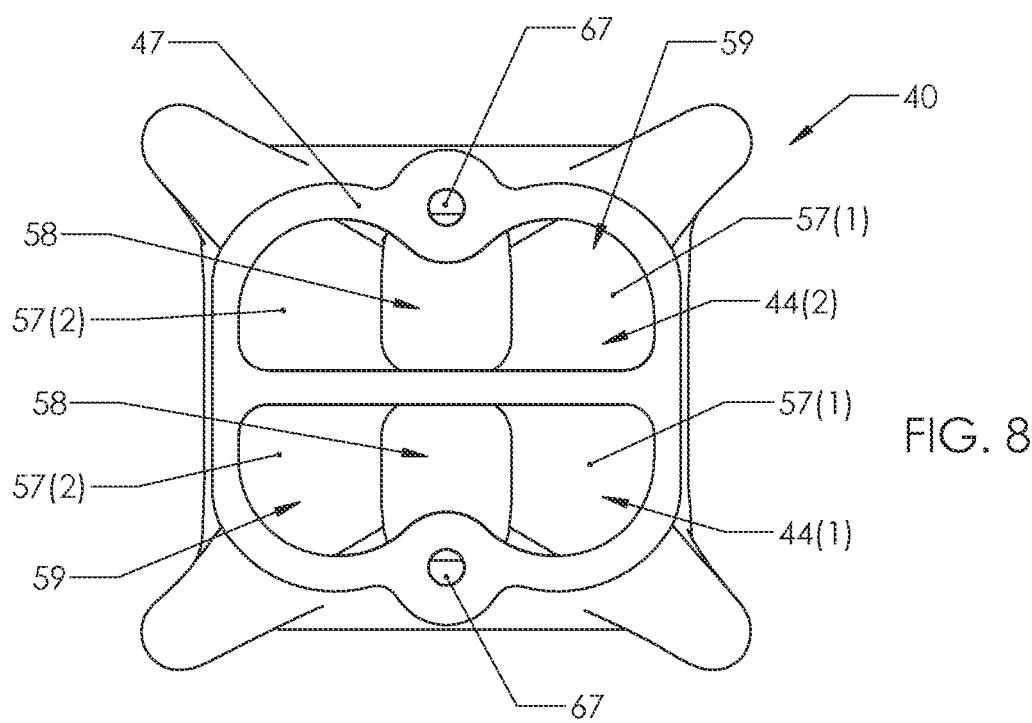
FIG. 8 is a bottom plan view of the divider body shown in FIG. 6.

With further reference to FIGS. 7 and 9, each plenum includes sloping wall portions 56(1) and 56(2). Thus, each plenum has a larger inlet opening 55 which funnels or converges via wall portions 56(1), 56(2) to a smaller aperture opening 58. Accordingly, the fuel/air mixture is guided to the center of the plenum. Guiding the fuel/air mixture to the center of the plenum provides even fuel distribution between the runners connected to the plenum. In this case, the inlet opening 55 is obround in shape. Aperture openings 58 are, in this case, rectangular openings with a length Z, which is approximately equal to the width of each plenum 44, and a width Y. In this case length Z is approximately 1.75 inches and the width Y is approximately 1.375 inches. It should be understood that the shape and dimensions of the inlet and aperture openings of the plenums may vary depending on the particular engine and operating characteristics desired. For example, enlarging the aperture opening 58 may increase peak horsepower but potentially at the expense of low RPM drivability. With reference to FIGS. 8 and 9, each plenum also includes sloping wall portions 57(1) and 57(2). Each plenum diverges via wall portions 57(1), 57(2) from aperture opening 58 to outlet opening 59.

Referring again to FIG. 1, it can be appreciated that the tunnel ram 20 may comprise several components that are bolted together. In this case, the manifold 20 comprises a base portion 22 and a pair of divider bodies 40(1) and 40(2) that are each bolted to the base portion at a joint 32. However, the manifold may be cast as one piece with the appropriate dividers in place such that only two intake runners are fed by half of each carburetor. Furthermore, it will be appreciated by those skilled in the art that portions of existing traditional tunnel ram intake manifolds may be replaced with divider plates or divider bodies according to the present disclosure, thereby improving the low RPM performance of existing tunnel ram installations. Moreover, different tunnel ram configurations may be divided into the four separate plenums as described herein. For example, the traditional single plenum tunnel ram manifold (such as the above mentioned Victor Ram from Edelbrock) may be retrofitted with a new cover that includes appropriate dividers to create four separate plenums. Appropriate dividers may comprise foam rubber in order to comply with the rough casting surface of such manifolds. The tunnel ram may be cast from a suitable metal, such as aluminum or steel for example. Furthermore, the tunnel ram may be comprised of plastic or composite material. The tunnel ram may be fabricated from metal, plastic, or other suitable material and/or process.

Those ordinarily skilled in the art are aware that 4-barrel carburetors often have a pair of primary venturis and a pair of secondary venturis. The primary venturis are used for low load operation while all four venturis are activated for high load operation. As can be appreciated in FIG. 3, the transverse orientation of divider 42 means that the intake manifold is, in this case, set up for the carburetors to be mounted "sideways", that is with the primary venturis on one side of the engine and the secondary venturis on the other side. This is referred to as "sideways" by those skilled in the art because the conventional way to mount the carburetor is to have the primary venturis face the front of the engine (and the front of the vehicle, in conventional, non-transverse engine mounting). With transversely oriented dividers, mounting the carburetor sideways means that each pair of cylinders is fed by both a primary and a secondary venturi. Otherwise, one pair of cylinders would only be fed by primary venturis and another pair of cylinders would only be fed by secondary venturis. Mounting the carburetor sideways and having transverse dividers means that each plenum feeds opposed cylinders. For instance, cylinders 1 and 2 share the same plenum.

Sideways mounting is a way to accommodate larger carburetors in a dual carburetor setup. Those skilled in the art will appreciated that on Holley "double pumper" carburetors, for example, which have mechanically actuated secondary venturis, the fuel bowls extend out far enough that they cannot be mounted front-to-back except on very large "big-block" engines; thus, sideways mounting is necessary. Double pumpers are used for racing, and thus are popular street rod items even though they are less suited to street operation than single-pump, vacuum secondary carburetors. Carburetors have accelerator pumps to enrich the air-fuel mixture when the throttle is opened. An accelerator pump is a small bellows pump that squirts fuel down the venturi when the throttle is opened. The accelerator pump keeps the mixture from leaning out on throttle opening. Without it, when the throttle is opened, the air flow rises instantly but it takes the fuel metering signal a second or so to catch up, which results in a lean stumble. All 4-venturi carburetors have accelerator pumps on the primaries. Street car carburetors have the secondaries controlled by a mechanism that senses airflow and opens the secondaries slowly as demand rises, so they do not need an accelerator pump on the secondaries. "Double pumpers" open the secondaries with the throttle lever regardless of airflow demand from the engine, and therefore require an accelerator pump for the secondaries as well. They are also called mechanical secondary carburetors. Many street engine configurations use a vacuum secondary carburetor for drivability and fuel economy. However, street rod enthusiasts prefer to use the dual carburetor setup with a pair of double pumper carburetors for their racing appearance. To implement such a setup on a small-block V8 requires sideways mounting.

Figure 11:
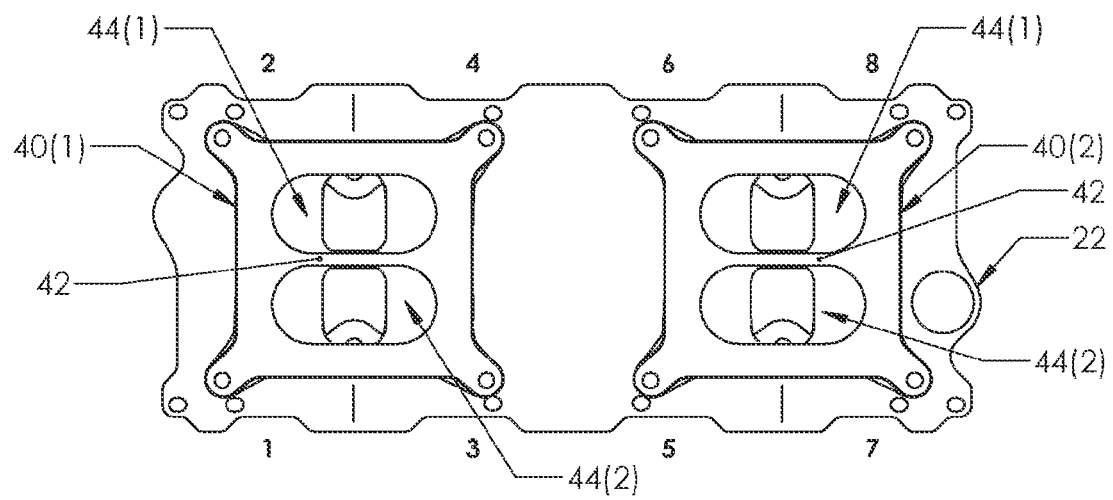
FIG. 11 is a top plan view of a tunnel ram intake manifold configured for front-to-back carburetor mounting.

As mentioned above, the dividers may, as an alternative, be oriented parallel to the centerline of the engine. FIG. 11 illustrates a manifold configured for use with carburetors mounted front to back. In this case divider bodies 40(1) and 40(2) are oriented such that the dividers 42 extend parallel to the engine and manifold. Accordingly, each divider body 40 includes a pair of plenums 44(1) and 44(2) separated by divider 42. Thus, the cylinders are paired into four plenums as follows: 1-3, 2-4, 5-7, and 6-8.

Figure 12:
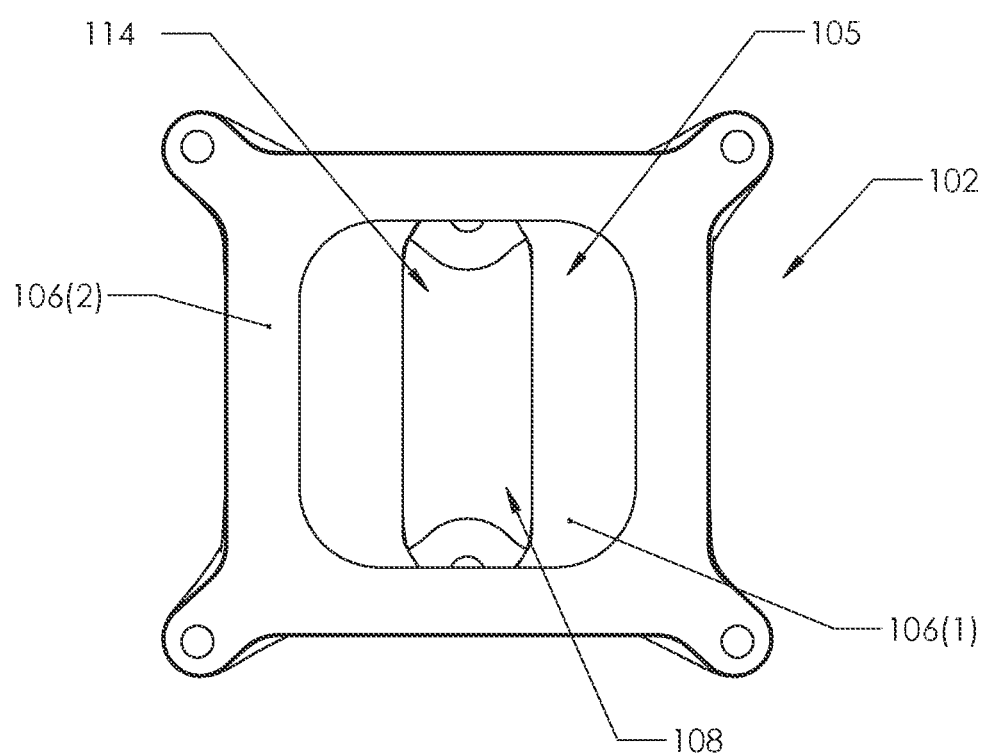
FIG. 12 is a top plan view of a converging plenum according to an exemplary embodiment.

Also contemplated herein is a converging plenum 102, shown in FIG. 12, which is similar to the above-described divider bodies such as shown in FIGS. 4-10. However, in this case, the converging plenum 102 does not include a divider wall. Accordingly, the converging plenum 102 has a single plenum 114. Plenum 114 includes a pair of sloping wall portions 106(1) and 106(2) that converge to an aperture 108. The plenum converges from an inlet opening 105 via sloping wall portions 106(1) and 106(2) to the aperture opening 108. In an embodiment, the converging plenum 102 may include diverging wall portions similar to those described above with respect to FIGS. 8 and 9. Converging plenum 102 could be used in certain applications in place of the divider body 40 described above in order to improve fuel distribution.

Figure 13:
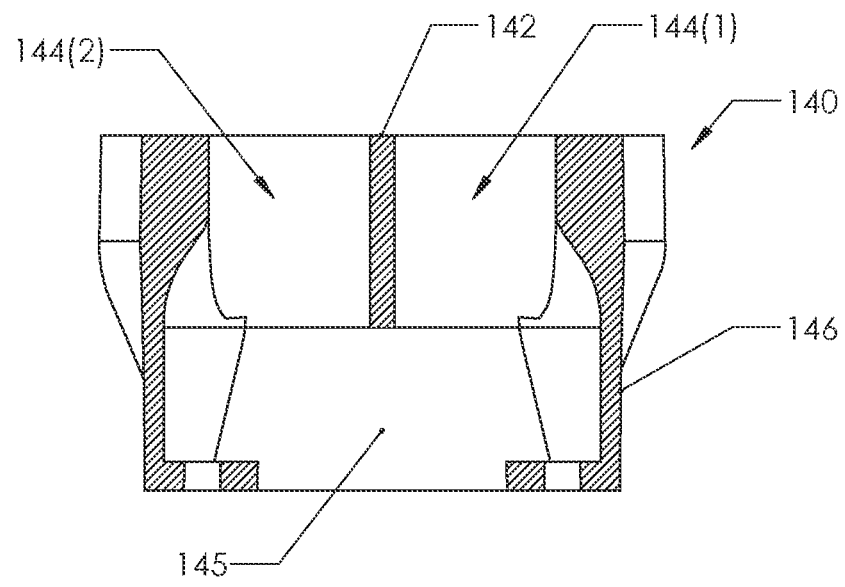
FIG. 13 is a cross-sectional view of a divider body according to a second exemplary embodiment with a divider wall that extends only partially down the length of the body.

FIG. 13 illustrates another exemplary embodiment of a divider body 140 that, like divider body 40 described above, includes a pair of plenums 144(1) and 144(2) that are separated by divider wall 142. However, in this case, the divider wall 142 does not extend all the way down the depth of body portion 146. Accordingly, the plenums 144(1) and 144(2) intersect a common plenum 145 within the body portion 146. This configuration allows a certain amount of airflow sharing between the venturis of the associated carburetor. The amount of airflow sharing may be varied by adjusting how far down the body portion 146 divider wall 142 extends. For example, in this embodiment, the divider wall 142 may extend approximately half way down the body portion. Divider body 140 could be used in certain applications in place of the divider body 40 described above.

Figure 14:
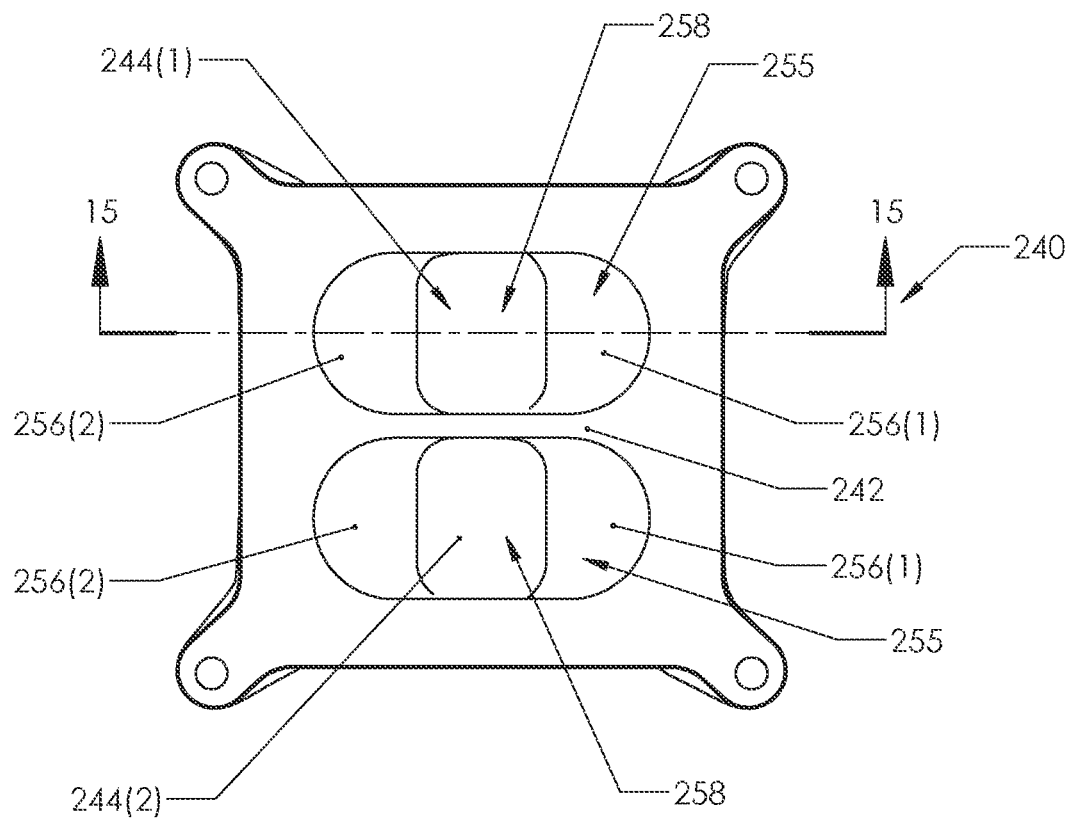
FIG. 14 is a top plan view of a funnel body according to an exemplary embodiment.
Figure 15:
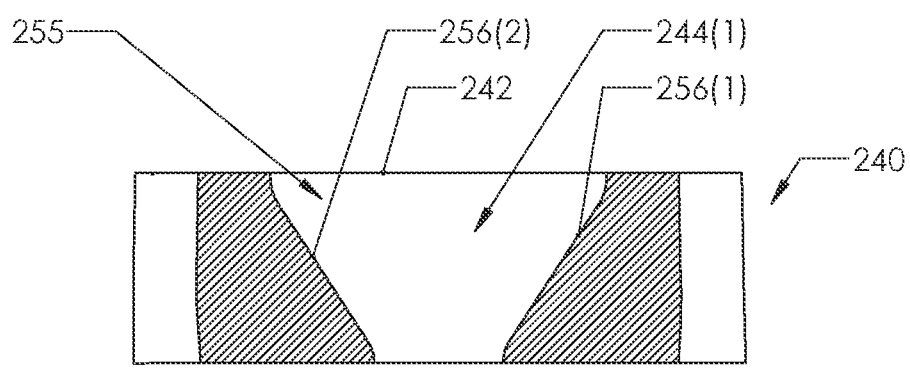
FIG. 15 is a cross-sectional view of the funnel body taken about lines 15-15 in FIG. 14.
Figure 16:
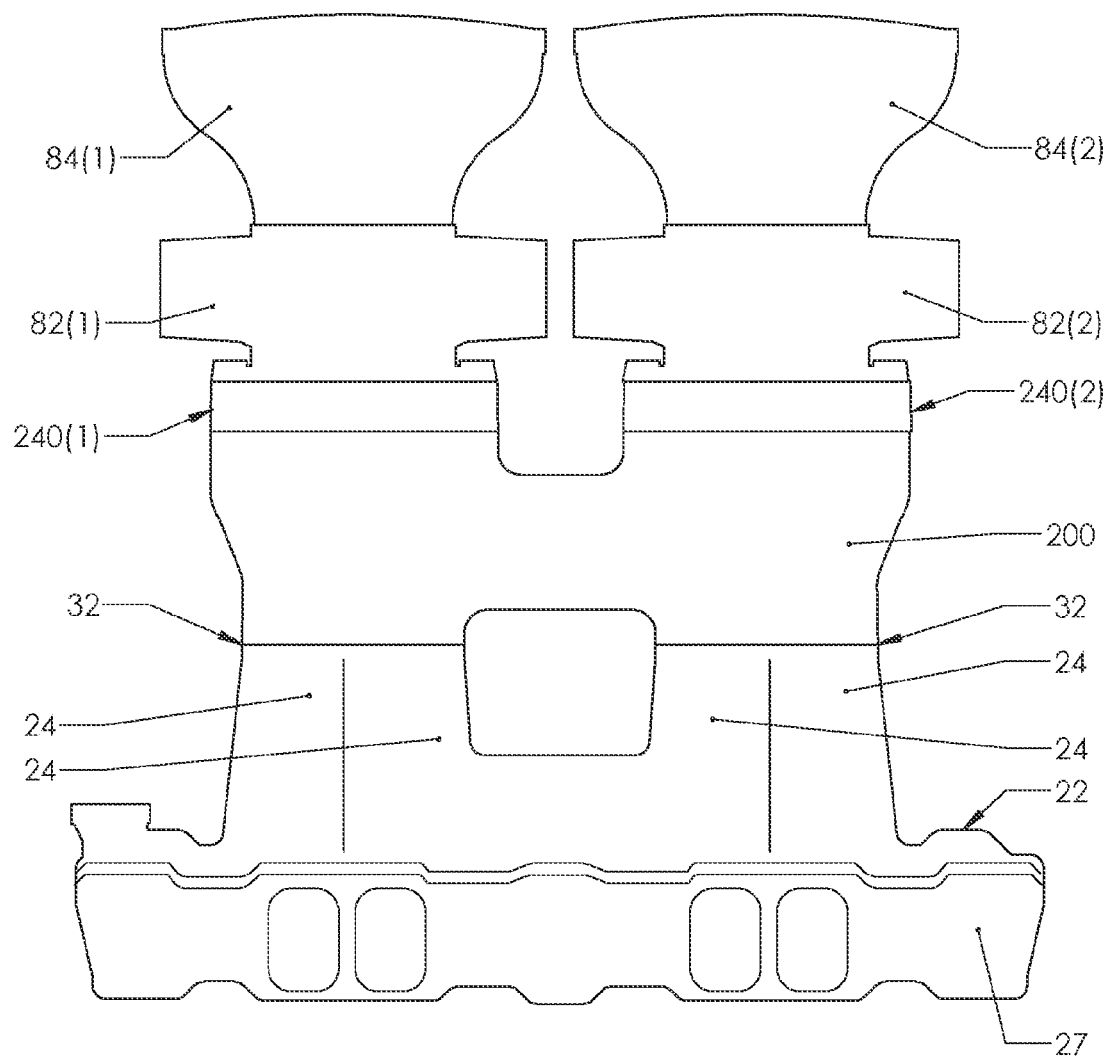
FIG. 16 is a side view in elevation of a tunnel ram manifold configuration that employs a pair of funnel bodies shown in FIG. 14 along with a traditional tunnel ram common plenum.

FIGS. 14 and 15 illustrate a funnel body 240 that is similar to the divider body 40 described in FIGS. 4-10 in that it includes sloping side walls 256(1) and 256(2) that extend towards an aperture 258; however, in this case, aperture 258 is the outlet and there are not diverging sloping sidewalls (see FIG. 15). This configuration of divider body is useful when paired with a traditional common plenum 200, an example of which is shown in FIG. 16. A suitable common plenum is available from Weiand® (part No. 1912) and attaches to the base portion 22. As shown in FIG. 16, a pair of funnel bodies 240(1), 240(2) are disposed between the common plenum 200 and carburetors 82(1), 82(2). In this embodiment, the funnel bodies 240 include a pair of plenums 244(1) and 244(2) separated by divider wall 242. As mentioned above, each plenum 244(1), 244(2) includes a pair of sloping side walls 256(1), 256(2) that converge to an outlet aperture 258. As in previous embodiments, the inlet opening 255 is obround in shape and converges to a generally rectangular outlet aperture 258. This configuration allows a certain amount of airflow sharing between the carburetors. The amount of sharing may be adjusted by varying the volume of the plenum, which may be accomplished by varying the height of the plenum, or by adding material to the center section between the runners to take up volume inside the common plenum.

Figure 17:
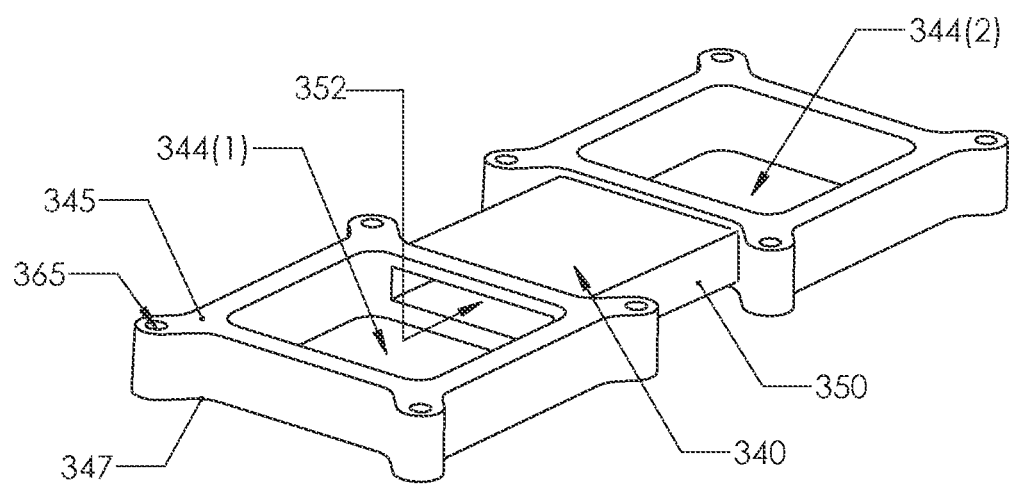
FIG. 17 is a perspective view of a common plenum according to an exemplary embodiment.
Figure 18:
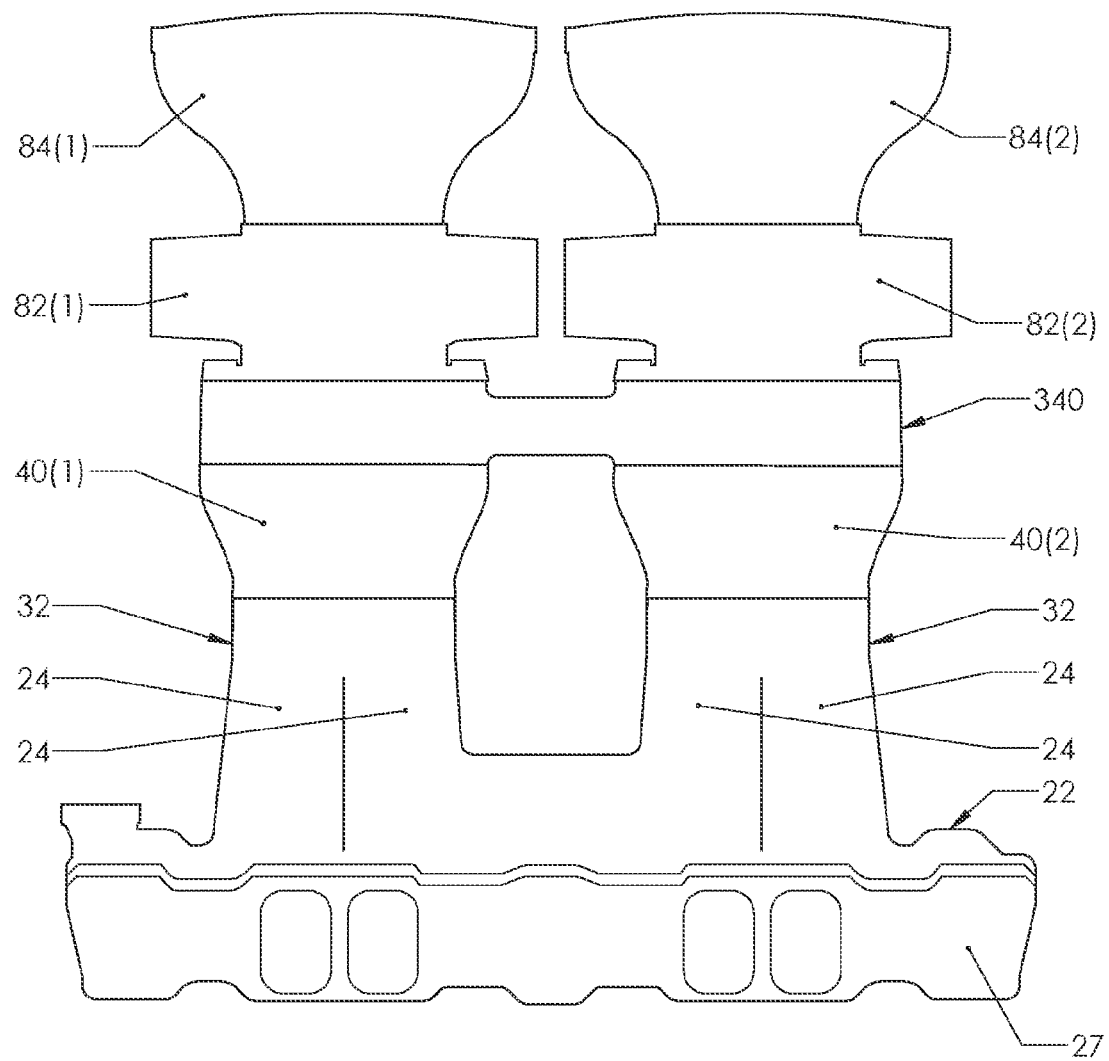
FIG. 18 is a side view in elevation of a tunnel ram manifold configuration that employs the common manifold shown in FIG. 17.

FIG. 17 illustrates a common plenum 340, according to an exemplary embodiment, that is adapted for use with divider bodies 40 as shown in FIG. 18. The common plenum 340 is disposed between the divider bodies 40 and carburetors 82. As shown in FIG. 17, the common plenum 340 includes a pair of plenum chambers 344(1) and 344(2) that are connected by tunnel 350, which has an interior 352. Accordingly, plenums 344(1) and 344(2) are in fluid communication with each other via tunnel 350. As shown, the common plenum 340 is configured with standard carburetor mounting flanges, as are known in the art, with mounting surfaces 345, 347, and associated mounting holes 365. Providing a small single plenum on top of the existing four-plenum structure allows some airflow sharing between the carburetors under high-RPM, high-load operation. Accordingly, the vacuum and flow variations seen by each carburetor will be reduced, thereby allowing the use of carburetors with a more off-the-shelf tune with respect to the emulsion circuit, air bleeds, power valve, and secondary spring. The height of plenums 344(1), 344(2) may be changed to provide a trade off between low-RPM performance and high-RPM performance.

While the tunnel ram has been described in the various embodiments, constructions, and configurations as a complete manifold, it is also contemplated that various retrofit components could be provided that are operative to modify existing tunnel ram intake manifolds. These retrofit components could be in the form of individual bolt on components or in kit form including instructions and ancillary items such as suitably sized carburetor jets, air bleeds, and emulsion tubes for a particular application. In an embodiment, the kit comprises at least one divider body 40(1) and at least one carburetor 82(1). With reference to FIG. 1, the kit may include a pair of divider bodies 40(1), 40(2) and a pair of carburetors 82(1), 82(2). In an embodiment, the kit also includes a conventional tunnel ram base 22. Furthermore, the kit may include associated air cleaners and/or velocity stacks 84(1), 84(2).

Also, contemplated are methods for retrofitting an engine with an improved tunnel ram intake according to the present disclosure. The methods thus encompass the steps inherent in the above described mechanical structures and operation thereof. Broadly, one method could include removing the top plate or divider bodies of a conventional tunnel ram and replacing it with divider bodies or a top plate having appropriate dividers according to the teachings herein.

Accordingly, the improved tunnel ram intake manifold has been described with some degree of particularity directed to the exemplary embodiments. It should be appreciated, though, that the technology of the present application is defined by the following claims construed in light of the prior art so that modifications or changes may be made to the exemplary embodiments without departing from the inventive concepts contained herein.

What is claimed is:

1. A tunnel ram manifold, comprising:
   first and second port flanges mateable to an engine;
   first and second converging plenums each having a carburetor mounting flange;
   a first pair of runners extending from the first port flange to the first converging plenum;
   a second pair of runners extending from the first port flange to the second converging plenum;
   a third pair of runners extending from the second port flange to the second converging plenum; and
   a fourth pair of runners extending from the second port flange to the first converging plenum;
   wherein each converging plenum includes an inlet opening adjacent its associated carburetor mounting flange converging to an aperture smaller than the inlet opening.

2. The manifold according to claim 1, wherein each converging plenum includes a pair of sloped surfaces extending from the inlet opening to the aperture.

3. The manifold according to claim 1, wherein each aperture is rectangular in shape.

4. The manifold according to claim 3, wherein each rectangular aperture extends longitudinally with respect to the engine.

5. The manifold according to claim 1, further comprising a joint between each converging plenum and its associated runners.

6. A converging plenum for use with a conventional tunnel ram base, the plenum comprising:
   a mounting flange securable to a conventional tunnel ram base;
   a carburetor flange;
   a body portion extending between the mounting flange and the carburetor flange; and
   an inlet opening adjacent the carburetor flange converging to an aperture smaller than the inlet opening.

7. The plenum according to claim 6, including a pair of sloping wall portions extending from the inlet opening to the aperture.

8. The plenum according to claim 7, wherein the mounting flange is configured such that the pair of sloping wall portions extend longitudinally with respect to the conventional tunnel ram base when the mounting flange is secured thereto.

9. The plenum according to claim 7, wherein the mounting flange is configured such that the pair of sloping wall portions extend transversely with respect to the conventional tunnel ram base when the mounting flange is secured thereto.

10. The plenum according to claim 7, including a pair of diverging wall portions extending from the aperture to the mounting flange.

11. A tunnel ram intake manifold kit, comprising:
    at least one converging plenum, comprising:
       a mounting flange securable to a conventional tunnel ram base;
       a carburetor flange;
       a body portion extending between the mounting flange and the carburetor flange; and
       an inlet opening adjacent the carburetor flange converging to an aperture smaller than the inlet opening; and
    at least one carburetor mountable to the carburetor flange.

12. The tunnel ram intake manifold kit according to claim 11, including a pair of converging plenums and a pair of carburetors.

13. The tunnel ram intake manifold kit according to claim 12, including a conventional tunnel ram base.

14. The tunnel ram intake manifold kit according to claim 11, including a pair of sloped surfaces extending from the inlet opening to the aperture.

15. The tunnel ram intake manifold kit according to claim 14, wherein the aperture is rectangular in shape.

* * * * *